Figure 1:
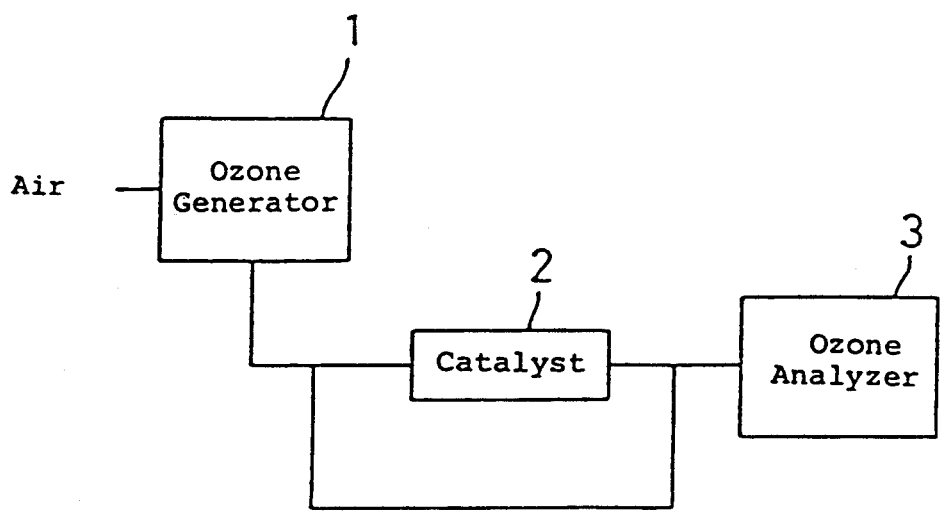

United States Patent [19]
Yoshimoto et al.

[11] Patent Number: 5,221,649
[45] Date of Patent: Jun. 22, 1993

[54] CATALYSTS AND METHODS FOR OZONE DECOMPOSITION

[75] Inventors: Masafumi Yoshimoto; Tadao Nakatsuji; Kazuhiko Nagano, all of Osaka, Japan

[73] Assignee: Sakai Chemical Industry Co., Ltd., Osaka, Japan

[21] Appl. No.: 838,822

[22] Filed: Feb. 21, 1992

Related U.S. Application Data

[63] Continuation of Ser. No. 441,917, Nov. 28, 1989, abandoned.

[30] Foreign Application Priority Data

| Nov. 28, 1988 | [JP] | Japan | 63-301403 |
| Feb. 10, 1989 | [JP] | Japan | 1-31684 |
| Feb. 21, 1989 | [JP] | Japan | 1-41330 |

[51] Int. Cl.$^5$ .......................... B01J 21/16; B01J 23/34
[52] U.S. Cl. ........................................................ 502/84
[58] Field of Search ........................... 502/84; 423/219

[56] References Cited

U.S. PATENT DOCUMENTS

| 3,361,531 | 1/1968 | Erb et al. | 423/219 |
| 4,379,129 | 4/1983 | Abe | 423/219 |

FOREIGN PATENT DOCUMENTS

| 0275620 | 7/1988 | European Pat. Off. . | |
| 0398766 | 11/1990 | European Pat. Off. . | |
| 1966535 | 4/1973 | Fed. Rep. of Germany . | |
| 2748471 | 6/1978 | Fed. Rep. of Germany . | |
| 49-94591 | 9/1974 | Japan . | |
| 52-75686 | 6/1977 | Japan | 423/219 |
| 53-87972 | 8/1978 | Japan . | |
| 54-002288 | 1/1979 | Japan . | |
| 54-119371 | 9/1979 | Japan . | |
| 57-050527 | 3/1982 | Japan . | |
| 57-71623 | 5/1982 | Japan | 423/219 |
| 57-1222924 | 7/1982 | Japan . | |
| 57-136940 | 8/1982 | Japan | 423/219 |
| 2201648 | 9/1987 | Japan | 423/219 |
| 64-056123 | 3/1989 | Japan . | |
| 0472675 | 9/1975 | U.S.S.R. | 423/219 |
| 617369 | 7/1978 | U.S.S.R. . | |

OTHER PUBLICATIONS

Rideal et al., Ozone—The Catalytic Decomposition of Ozone, p. 135, London, 1920.

*Primary Examiner*—Carl F. Dees
*Attorney, Agent, or Firm*—Wegner, Cantor, Mueller & Player

[57] ABSTRACT

A catalyst for ozone decomposition which comprises:
(a) at least one selected from the group consisting of clay and carbon;
(b) manganese dioxide; and optionally
(c) titanium dioxide; and/or
(d) at least one oxide of a metal selected from the group consisting of Cu, Co, Fe, Ni and Ag.

A further catalyst for ozone decomposition which comprises:
(a) at least one oxide of a metal selected from the group consisting of alkali metals and alkaline earth metals;
(b) manganese dioxide; and optionally
(c) titanium dioxide; and/or
(d) at least one selected from the group consisting of clay and carbon.

4 Claims, 1 Drawing Sheet

CATALYSTS AND METHODS FOR OZONE DECOMPOSITION

This application is a continuation of Ser. No. 07/441,917, filed Nov. 28, 1989 (and now adandoned).

This invention relates to a catalyst and a method for decomposing ozone which is contained, for example, in the air.

There has been proposed various methods of decomposing noxious ozone contained in the air, for example, an adsorption method wherein porous material is used such as activated carbon or zeolite, or an oxidative decomposition method wherein a catalyst is used such as $MnO_2$.

However, the above mentioned known methods of removing ozone are not satisfactory ones. The adsorption method has a disadvantage in that an adsorbent must be regenerated since it is limited in adsorption ability. Therefore, the working is laborous and the costs are high. The oxidative decomposition method has such no disadvantages as above described, but the known catalysts have no sufficient decomposition activity of ozone, and also deteriorate in activity very soon when they are used under severe conditions, for example, when a gas which contains high concentrations of ozone is treated or a gas is treated with a high area velocity.

The invention has been accomplished to solve the problem involved in the prior art of ozone decomposition, and it is an object of the invention to provide a catalyst of decomposing ozone which is higher in ozone decomposition activity but also more durable under severe reaction conditions than the known catalysts.

A further object of the invention is to provide a method of decomposing ozone effectively with such catalysts.

In accordance with the invention, there is provided a catalyst for ozone decomposition which comprises:
(a) at least one selected from the group consisting of clay and carbon; and
(b) manganese dioxide.

Further in accordance with the invention, there is provided a catalyst for ozone decomposition which comprises:
(a) at least one selected from the group consisting of clay and carbon;
(b) manganese dioxide; and
(c) titanium dioxide.

FIG. 1 is a diagram for measurement of ozone decomposition activity of catalyst as described hereinafter.

Herein the specification, the term, catalyst, means active components which have ozone decomposition activity, and the term, catalyst, is a synonym of active components. The catalyst is usually supported on a carrier to form a catalyst structure, or is molded into a mold structure together with other molding components, for practical use. These structures will be referred to as catalyst structures.

The first catalysts of the invention may be exemplified by, for example, clay/$MnO_2$, clay/$MnO_2$/$TiO_2$, carbon/$MnO_2$ or carbon/$MnO_2$/$TiO_2$.

In the first catalysts of the invention, manganese dioxide is contained therein in amounts of 20–90% by weight and at least one selected from the group consisting of clay and carbon is contained in amounts of 10–50% by weight. When the amount of manganese dioxide, or clay or carbon is less than the above specified, the resultant catalyst is low in decomposition activity of ozone, however, when the amount is more than the above specified, no remarkable increase in activity is attained corresponding to the amount increased.

The catalyst of the invention may contain titanium dioxide together with manganese dioxide. Titanium dioxide improves decomposition activity of ozone, but also makes the resultant catalyst more resistant to deterioration of catalyst activity, namely more durable in use under severe reaction conditions. Titanium dioxide is contained in the catalyst preferably in amounts of 10–30% by weight. When the amount of titanium dioxide in the catalyst is less than 10% by weight, the resultant catalyst shows little improvement in such a manner as above described. However, if the amount is more than 30% by weight, little improvement is attained corresponding to the increased amount.

Further according to the invention, the catalyst is improved in ozone decomposition activity by displacing in part manganese dioxide by at least one oxide of a metal selected from the group consisting of Cu, Co, Fe, Ni and Ag, preferably in amounts of 1–30% based on the manganese dioxide. When the displacement is less than 1% by weight based on the manganese dioxide, the catalyst shows little improvement in activity, whereas when more than 30% by weight, no corresponding improvement in activity is attained.

As catalysts wherein the manganese dioxide is in part displaced by the metal oxide, these may be exemplified by $MnO_2$/$CuO_2$/clay(/$TiO_2$), $MnO_2$/$Co_3O_4$/clay(/$TiO_2$), $MnO_2$/$Fe_2O_3$/clay(/$TiO_2$), $MnO_2$/$NiO$/clay(/$TiO_2$), $MnO_2$/$Ag_2O$/clay(/$TiO_2$), $MnO_2$/$CuO_2$/carbon(/$TiO_2$), $MnO_2$/$Co_3O_4$/carbon(/$TiO_2$), $MnO_2$/$Fe_2O_3$/carbon(/$TiO_2$), $MnO_2$/$NiO$/carbon(/$TiO_2$), $MnO_2$/$Ag_2O$/carbon(/$TiO_2$), and the like.

The clay used may be laminal clay minerals such as pyrophyllite, talc, mica, chlorite, montmorillonite, kaolin or halloysite, and Kibushi clay or Gairome clay is preferably used. The carbon used may be activated carbon, graphite, carbon black or coke, among these activated carbon is most preferred.

In accordance with the invention, a second catalyst for ozone decomposition is provided which comprises:
(a) at least one oxide of a metal selected from the group consisting of alkali metals and alkaline earth metals; and
(b) manganese dioxide.

A further catalyst is also provided which comprises:
(a) at least one oxide of a metal selected from the group consisting of alkali metals and alkaline earth metals;
(b) manganese dioxide; and
(c) titanium dioxide.

These catalysts may further contain at least one selected from the group consisting of clay and carbon, and may be exemplified by, for example, binary catalysts such as $Na_2O$/$MnO_2$, $K_2O$/$MnO_2$, $MgO$/$MnO_2$ or $CaO$/$MnO_2$; ternary catalysts such as $Na_2O$/$MnO_2$/$TiO_2$, $K_2O$/$MnO_2$/$TiO_2$, $MgO$/$MnO_2$/$TiO_2$, $CaO$/$MnO_2$/$TiO_2$, $Na_2O$/$MnO_2$/clay, $K_2O$/$MnO_2$/clay, $MgO$/$MnO_2$/clay or $CaO$/$MnO_2$/clay; and four component catalysts such as $Na_2O$/$MnO_2$/$TiO_2$/clay, $K_2O$/$MnO_2$/$TiO_2$/clay, $MgO$/$MnO_2$/$TiO_2$/clay or $CaO$/$MnO_2$/$TiO_2$/clay, among others.

The second catalysts contain at least one oxide of alkali metals or alkaline earth metals in amounts of 0.5–5% by weight therein. When the amount of the oxide is less than 0.5% by weight, the resultant catalyst is insufficient in activity of ozone decomposition. However, if the metal oxide is contained in amounts of more than 5% by weight, the corresponding increase in activity is not attained.

The catalyst contains manganese dioxide in amounts of 20-90% by weight therein. When the amount of manganese dioxide is less than 20% by weight, the resultant catalyst is small in activity of ozone decomposition. However, if the amount is more than 90% by weight, the corresponding increase in activity is not attained.

The catalyst of the invention may contain titanium dioxide. As hereinbefore described, titanium dioxide improves decomposition activity of ozone, but also makes the resultant catalyst more durable in use under severe reaction conditions, and is contained in the catalyst preferably in amounts of 10-30% by weight.

Clay, carbon or a mixture thereof as hereinbefore described may also be contained in the catalyst in amounts of not more than 50% by weight based on the catalyst.

Further, similarly to the first catalysts, the second ones are improved in activity by displacing manganese dioxide in part by at least one oxide of a metal selected from the group consisting of Cu, Co, Fe, Ni and Ag, preferably in amounts of 1-30% based on the manganese dioxide. When the displacement is less than 1% by weight based on the manganese dioxide, the catalyst shows little improvement in activity, whereas if the displacement is more than 30% by weight, no corresponding improvement in activity is attained.

The first and second catalysts of the invention may be produced by any known methods such as impregnating, kneading, coprecipitating, precipitating or oxide admixing methods, or a combination of these.

The catalyst or active components as set forth above is usually supported on an inactive carrier material to form a catalyst structure suitable for practical use. By way of example, the catalyst is obtained as powder and made into a slurry with water, and a honeycomb carrier is immersed in the slurry, and dried, to provide a honeycomb catalyst structure. As a further method, the catalyst is kneaded together with inactive ceramic powder as a carrier material, molding assistants to provide the catalyst with plasiticity, reinforcements such as inorganic fibers to improve mechanical strength of the resultant structure and organic binders, and the mixture is then molded into a structure such as honeycomb.

Therefore, the catalyst structure is not specifically limited in form, and may be in the form of honeycombs, pellets, cylinders, plates or pipes.

The entire catalyst structure may be composed of the active components, but when carrier structures or reinforcements are used to produce catalyst structures, it is preferred that the catalyst structure contains the active components preferably in amounts of not less than 50%, more preferably in amounts of not less than 75%, supported thereon.

The ozone decomposition may be carried out by putting a reactant gas which contains ozone therein into contact with the catalyst, thereby to catalytically decompose the ozone.

The ozone decomposition may be carried out at temperatures of 0°-40° C., preferably of 10°-30° C. When the reaction temperature is less than 0° C., the reaction velocity is infeasibly slow. However, heat energy is needed when the reaction is carried out at temperatures of more than 40° C., and moreover, little improvement in decomposition rate is attained, so that reaction at high temperatures is undesirable mainly from the standpoint of energy economy.

A reactant gas which contains ozone is put into contact with the catalyst preferably at an area velocity ($m^3/m^2 \cdot hr$) of 5-50, wherein the area velocity is defined as value of space velocity ($hr^{-1}$) divided by gas contact area per unit volume ($m^2/m^3$) of catalyst. When the area velocity is less than 5, a large volume of catalyst is undesirably needed whereas when more than 50, the ozone is not sufficiently decomposed and the decomposition rate is very small.

The known catalysts do not substantially deteriorate in activity when they are so used that ozone is decomposed under mild conditions of a small Ca value which is defined as the product of ozone concentration (ppm) at an inlet of a reactor and area velocity. However, many known catalysts rapidly deteriorate when the reaction is carried out under severe conditions of a Ca value of not less than 30. However, the catalysts of the invention do not substantially deteriorate in activity even when it is used under severe conditions of a large CA value of not less than 30.

The catalyst of the invention has a high activity of ozone decomposition and durable even when it is used under severe conditions.

The invention will now be described in more detail with reference to examples, however, the invention is not limited thereto. Optionally Titanium Dioxide And-/Or At Least One Oxide Of A Metal Selected From The Group Consisting Of Cu, Co, Fe, Ni, And Ag.

A. Preparation of Catalysts

EXAMPLE 1

An amount of 704 g of manganese dioxide having a specific surface area of 48 $m^2/g$ and 155 g of Kibushi clay were suspended in one liter of water, and there were added thereto 250 g of glass beads. The mixture was stirred over three hours, to provide a slurry.

The slurry was impregnated into a honeycomb formed with corrugates of ceramic fibers and having a porosity of 81% and a pitch of 4.0 mm, to provide a catalyst structure having a binary catalyst of $MnO_2$/clay (82/18 in a weight ratio) supported on the honeycomb in a support ratio of 95 %. The support ratio is defined as (weight of catalyst supported on the honeycomb/weight of the honeycomb)×100 (%).

EXAMPLE 2

An amount of 704 g of manganese dioxide having a specific surface area of 48 $m^2/g$, 78 g of Kibushi clay and 517 ml of titania sol ($TiO_2$ content: 150 g/l) were added to 500 ml of water, and there were added thereto 250 g of glass beads. The mixture was stirred over three hours, to provide a slurry.

The slurry was impregnated into the same honeycomb as in the Example 1, to provide a catalyst structure having a ternary catalyst if $MnO_2/TiO_2$/clay (82/9/9 in a weight ratio) supported on the honeycomb in a support ratio of 95 %.

EXAMPLE 3

An amount of 30 g of manganese dioxide having a specific surface area of 48 $m^2/g$, 95 g of Kibushi clay and 500 ml of water were used, and otherwise in the same manner as in the Example 1, a catalyst structure was prepared which had a binary catalyst of $MnO_2$/- clay (24/76 in a weight ratio) supported on the honeycomb in a support ratio of 103% %.

EXAMPLE 4

An amount of 30 g of manganese dioxide having a specific surface area of 48 m²/g, 70 g of Kibushi clay, 170 ml of titania sol and 500 ml of water were used, and otherwise in the same manner as in the Example 3, a catalyst structure was prepared which had a ternary catalyst of $MnO_2/TiO_2$/clay (24/20/56 in a weight ratio) supported on the honeycomb in a support ratio of 101%.

EXAMPLE 5

An amount of 43 g of cupric oxide (CuO) was used together with 661 g of manganese dioxide, and otherwise in the same manner as in the Example 1, a catalyst structure was prepared which had a ternary catalyst of $MnO_2$/CuO/clay (77/5/18 in a weight ratio) supported on the honeycomb in a support ratio of 97%.

EXAMPLE 6

An amount of 17 g of cobalt oxide ($Co_3O_4$) having a specific surface area of 53 m²/g was used together with 697 g of manganese dioxide, and otherwise in the same manner as in the Example 1, a catalyst structure was prepared which had a ternary catalyst of $MnO_2/Co_3O_4$/clay (80/2/18 in a weight ratio) supported on the honeycomb in a support ratio of 101%.

EXAMPLE 7

An amount of 70 g of ferric oxide ($Fe_2O_3$) having a specific surface area of 53 m²/g was used together with 634 g of manganese dioxide, and otherwise in the same manner as in the Example 1, a catalyst structure was prepared which had a ternary catalyst of $MnO_2/Fe_2O_3$/clay (74/8/18 in a weight ratio) supported on the honeycomb in a support ratio of 98%.

EXAMPLE 8

An amount of 50 g of nickel oxide (NiO) was used together with 654 g of manganese dioxide, and otherwise in the same manner as in the Example 1, a catalyst structure was prepared which had a ternary catalyst of $MnO_2$/NiO/clay (76/6/18 in a weight ratio) supported on the honeycomb in a support ratio of 100%.

EXAMPLE 9

An amount of 17 g of silver oxide ($Ag_2O$) was used together with 687 g of manganese dioxide, and otherwise in the same manner as in the Example 1, a catalyst structure was prepared which had a ternary catalyst of $MnO_2/Ag_2O$/clay (80/2/18 in a weight ratio) supported on the honeycomb in a support ratio of 100%.

EXAMPLE 10

An amount of 661 g of manganese dioxide, 43 g of cupric oxide, 78 g of Kibushi clay and 517 ml of titania sol were used, and otherwise in the same manner as in the Example 5, a catalyst structure was prepared which had a four component catalyst of $MnO_2/CuO/TiO_2$/clay (77/5/9/9 in a weight ratio) supported on the honeycomb in a support ratio of 103%.

EXAMPLE 11

An amount of 687 g of manganese dioxide, 17 g of silver oxide, 78 g of Kibushi clay and 517 ml of titania sol were used, and otherwise in the same manner as in the Example 5, a catalyst structure was prepared which had a four component catalyst of $MnO_2/Ag_2O/TiO_2$/clay (80/2/9/9 in a weight ratio) supported on the honeycomb in a support ratio of 102%.

COMPARATIVE EXAMPLE 1

An amount of 30 g of manganese dioxide having a specific surface area of 48 m²/g and 70 g of a mixture of titanium tetrachloride and silica sol (1/1 in a weight ratio as $TiO_2/SiO_2$) were mixed together under stirring while ammonia gas was blown thereinto to neutralize the mixture and provide slurry precipitates.

After fully washing with water, the precipitate was calcined at a temperature of 500° C. for three hours, to provide a ternary catalyst of $MnO_2/TiO_2/SiO_2$ (30/35/35 in a weight ratio) of a specific surface area of 162 m²/g.

B. Measurement of Catalyst Activity

The activity of the catalysts prepared in the Examples 1–11 and the Comparative Examples 1 was measured in accordance with a flow sheet as shown in FIG. 1, in which (1) designates an ozone generator, into which air is introduced to generate air which contains ozone in an appropriate concentration. The air is then sent to a catalyst reactor (2) to catalytically decompose the ozone in the reactor. The ozone concentration in the air is determined with an ozone analyzer (3) at the inlet and the outlet of the reactor. Ozone decomposition rate (%) is calculated based on an expression: [(ozone concentration at inlet − ozone concentration at outlet)/ozone concentration at inlet] × 100.

The reaction temperature was 20° C. and the space velocity was 20000 hr⁻¹. The results are shown in the Table 1.

As apparent from the Table 1, the catalysts prepared in the Examples 1–11 were found higher in ozone decomposition rate than than the catalyst of the Comparative Example 1.

TABLE 1

| Catalysts | | Compositions (Weight ratio) | Ozone Decomposition Rate (%) |
|---|---|---|---|
| Example 1 | $MnO_2$/clay | 82/18 | 89.9 |
| Example 2 | $MnO_2/TiO_2$/clay | 82/9/9 | 93.5 |
| Example 3 | $MnO_2$/clay | 24/76 | 88.2 |
| Example 4 | $MnO_2/TiO_2$/clay | 24/20/56 | 90.5 |
| Example 5 | $MnO_2$/CuO/clay | 75/5/18 | 98.5 |
| Example 6 | $MnO_2/Co_3O_4$/clay | 82/2/18 | 97.5 |
| Example 7 | $MnO_2/Fe_2O_3$/clay | 74/8/18 | 97.6 |
| Example 8 | $MnO_2$/NiO/clay | 74/6/18 | 96.7 |
| Example 9 | $MnO/Ag_2O$/clay | 80/2/18 | 98.1 |
| Example 10 | $MnO_2$/CuO/clay | 77/5/9/9 | 100.0 |
| Example 11 | $MnO_2/Ag_2O/TiO_2$/clay | 80/2/9/9 | 100.0 |
| Reference 1 | $MnO_2/SiO_2/TiO_2$ | 30/35/35 | 86.8 |

II. Catalysts Composed Of Carbon and Manganese Dioxide, And Optionally Titanium Dioxide And/Or At Least One Oxide Of A Metal Selected From The Group Consisting Of Cu, Co, Fe, Ni And Ag.

A. Preparation of Catalysts

EXAMPLE 1

An amount of 704 g of manganese dioxide having a specific surface area of 48 m²/g and 155 g of activated carbon were suspended in one liter of water, and there were added thereto 250 g of glass beads. The mixture was stirred over three hours, to provide a slurry.

The slurry was impregnated into a honeycomb formed with corrugates of ceramic fibers and having a porosity of 81% and a pitch of 4.0 mm, to provide a catalyst structure having a binary catalyst of $MnO_2$/activated carbon (82/18 in a weight ratio) supported on the honeycomb in a support ratio of 68%.

EXAMPLE 2

An amount of 704 g of manganese dioxide having a specific surface area of 48 $m^2/g$, 78 g of activated carbon and 517 ml of titania sol ($TiO_2$ content: 150 g/l) were added to 500 ml of water, and there were added thereto 250 g of glass beads. The mixture was stirred over three hours, to provide a slurry.

The slurry was impregnated into the same honeycomb as in the Example 1, to provide a catalyst structure having a ternary catalyst of $MnO_2/TiO_2$/activated carbon (82/9/9 in a weight ratio) supported on the honeycomb in a support ratio of 83%.

EXAMPLE 3

An amount of 70 g of manganese dioxide having a specific surface area of 48 $m^2/g$, 30 g of activated carbon and 500 ml of water were used, and otherwise in the same manner as in the Example 1, a catalyst structure was prepared which had a binary catalyst of $MnO_2$/activated carbon (70/30 in a weight ratio) supported on the honeycomb in a support ratio of 53%.

EXAMPLE 4

An amount of 70 g of manganese dioxide having a specific surface area of 48 $m^2/g$, 50 g of graphite, 250 ml of titania sol and 500 ml of water were used, and otherwise in the same manner as in the Example 3, a catalyst structure was prepared which had a ternary catalyst of $MnO_2/TiO_2$/graphite (45/25/30 in a weight ratio) supported on the honeycomb in a support ratio of 52%.

EXAMPLE 5

An amount of 43 g of cupric oxide (CuO) was used together with 661 g of manganese dioxide having a specific surface area of 48 $m^2/g$, and otherwise in the same manner as in the Example 1, a catalyst structure was prepared which had a ternary catalyst of $MnO_2$/CuO/activated carbon (77/5/18 in a weight ratio) supported on the honeycomb in a support ratio of 65%.

EXAMPLE 6

An amount of 17 g of cobalt oxide ($Co_3O_4$) having a specific surface area of 53 $m^2/g$ was used together with 687 g of manganese dioxide having a specific surface area of 48 $m^2/g$, and otherwise in the same manner as in the Example 1, a catalyst structure was prepared which had a ternary catalyst of $MnO_2/Co_3O_4$/activated carbon (80/2/18 in a weight ratio) supported on the honeycomb in a support ratio of 71%.

EXAMPLE 7

An amount of 70 g of ferric oxide ($Fe_2O_3$) having a specific surface area of 53 $m^2/g$ was used together with 634 g of manganese dioxide having a specific surface area of 48 $m^2/g$, and otherwise in the same manner as in the Example 1, a catalyst structure was prepared which had a ternary catalyst of $MnO_2/Fe_2O_3$/activated carbon (74/8/18 in a weight ratio) supported on the honeycomb in a support ratio of 62%.

EXAMPLE 8

An amount of 50 g of nickel oxide (NiO) was used together with 654 g of manganese dioxide having a specific surface area of 48 $m^2/g$, and otherwise in the same manner as in the Example 1, a catalyst structure was prepared which had a ternary catalyst of $MnO_2$/NiO/activated carbon (76/6/18 in a weight ratio) supported on the honeycomb in a support ratio of 100%.

EXAMPLE 9

An amount of 17 g of silver oxide ($Ag_2O$) was used together with 687 g of manganese dioxide having a specific surface area of 48 $m^2/g$, and otherwise in the same manner as in the Example 1, a catalyst structure was prepared which had a ternary catalyst of $MnO_2/Ag_2O$/activated carbon (80/2/18 in a weight ratio) supported on the honeycomb in a support ratio of 74%.

EXAMPLE 10

An amount of 43 g of cupric oxide, 661 g of manganese dioxide, 78 g of activated carbon and 517 ml of titania sol were used, and otherwise in the same manner as in the Example 5, a catalyst structure was prepared which had a four component catalyst of $MnO_2$/CuO/$TiO_2$/activated carbon (77/5/9/9 in a weight ratio) supported on the honeycomb in a support ratio of 103%.

EXAMPLE 11

An amount of 687 g of manganese dioxide, 17 g of silver oxide, 78 g of activated carbon and 517 ml of titania sol were used, and otherwise in the same manner as in the Example 9, a catalyst structure was prepared which had a four component catalyst of $MnO_2/Ag_2O$/$TiO_2$/activated carbon (80/2/9/9 in a weight ratio) supported on the honeycomb in a support ratio of 102%.

B. Measurement of Catalyst Activity

The activity of the catalysts prepared in the Examples 1-11 was measured in the same manner as hereinbefore described. The measurement with the catalyst of the Example 1 and the catalyst of the Comparative Example 1 in the Example I was carried out with varied CA values.

The results are shown in the Table 2. As apparent from the Table 2, the catalysts prepared in the Examples 1-11 were found higher in ozone decomposition activity and more durable under the severe conditions than the catalyst of the Comparative Example 1 in the Example I.

TABLE 2

| | Reaction Conditions | | | Ozone Decomposition Rate | | |
|---|---|---|---|---|---|---|
| | | Ozone Concentration | | | After | |
| | CA* | at Inlet (ppm) | Area Velocity ($m^3/m^2 \cdot hr$) | Initial | 1 hour (%) | 2 hours |
| Example 1 | 10 | 1 | 10 | 100 | 100 | 100 |
| | | 5 | 2 | 100 | 100 | 100 |
| | | 10 | 1 | 100 | 100 | 100 |
| | 30 | 1 | 30 | 95.4 | 95.6 | 95.3 |
| | | 5 | 6 | 100 | 100 | 100 |

TABLE 2-continued

| | | Reaction Conditions | | Ozone Decomposition Rate | | |
| --- | --- | --- | --- | --- | --- | --- |
| | | Ozone Concentration | | | After | |
| | CA* | at Inlet (ppm) | Area Velocity ($m^3/m^2 \cdot hr$) | Initial | 1 hour (%) | 2 hours |
| | 50 | 1 | 50 | 84.7 | 84.3 | 84.7 |
| | | 5 | 10 | 100 | 100 | 100 |
| Example 2 | 30 | 1 | 30 | 96.5 | 96.2 | 96.4 |
| | | 5 | 6 | 99.9 | 99.9 | 99.9 |
| | | 10 | 3 | 100 | 100 | 100 |
| Example 3 | 30 | 1 | 30 | 95.9 | 96.0 | 96.0 |
| | | 5 | 6 | 99.9 | 99.9 | 99.9 |
| | | 10 | 3 | 100 | 100 | 100 |
| Example 4 | 30 | 1 | 30 | 92.4 | 92.2 | 92.7 |
| Example 5 | 30 | 1 | 30 | 93.2 | 93.2 | 93.1 |
| Example 6 | 30 | 1 | 30 | 94.8 | 94.9 | 94.9 |
| Example 7 | 30 | 1 | 30 | 89.5 | 89.7 | 89.5 |
| Example 8 | 30 | 1 | 30 | 90.2 | 89.9 | 89.8 |
| Example 9 | 30 | 1 | 30 | 97.0 | 96.9 | 97.2 |
| Example 10 | 30 | 1 | 30 | 92.7 | 93.0 | 92.9 |
| Example 11 | 30 | 1 | 30 | 97.5 | 97.8 | 97.4 |
| Compara. 1 | 10 | 1 | 10 | 99.2 | 76.7 | 58.3 |
| | | 5 | 2 | 100 | 99.9 | 98.7 |
| | | 10 | 1 | 100 | 100 | 99.9 |
| | 30 | 1 | 30 | 80.2 | 38.5 | 25.3 |
| | | 5 | 6 | 100 | 91.2 | 76.7 |
| | | 10 | 3 | 100 | 99.2 | 94.5 |
| | 50 | 1 | 50 | 62.2 | 25.3 | 16.1 |
| | | 5 | 10 | 100 | 76.7 | 58.3 |
| | | 10 | 1 | 100 | 94.6 | 82.6 |

*(ppm · $m^3/m^2$ · hr)

III. Catalysts Composed Of At Least One Oxide Of A Metal Selected From The Group Consisting Of Alkali Metals And Alkaline Earth Metals, And Manganese Dioxide, Optionally Together With Titanium Dioxide, Clay Or Carbon.

A. Preparation of Catalysts

EXAMPLE 1

An amount of 500 g of manganese dioxide having a specific surface area of 48 $m^2/g$ and 250 g glass beads were suspended in one liter of water, and the mixture was stirred over three hours, to provide a slurry.

The slurry was impregnated into a honeycomb formed with corrugates of ceramic fibers and having a porosity of 81% and a pitch of 4.0 mm, to provide a honeycomb structure having $MnO_2$ supported thereon in a support ratio of 99%.

The structure was found to have a water absorption of 41.0%.

The honeycomb structure was immersed in a 31.5 g/l sodium hydroxide aqueous solution, excess solution was removed therefrom, air dried at normal temperatures, and calcined at a temperature of 100° C. for eight hours, to provide a honeycomb catalyst structure having a binary catalyst of $Na_2O/MnO_2$ (1/99 in a weight ratio) supported thereon.

EXAMPLE 2

A 94.5 g/l sodium hydroxide aqueous solution was used, and otherwise in the same manner as in the Example 1, a catalyst structure was prepared which had a binary catalyst of $Na_2O/MnO_2$ (2.9/97.1 in a weight ratio) supported thereon.

EXAMPLE 3

A 157.5 g/l sodium hydroxide aqueous solution was used, and otherwise in the same manner as in the Example 1, a catalyst structure was prepared which had a binary catalyst of $Na_2O/MnO_2$ (4.8/95.2 in a weight ratio) supported thereon.

EXAMPLE 4

A 29.1 g/l potassium hydroxide aqueous solution was used in place of the aqueous sodium hydroxide solution, and otherwise in the same manner as in the Example 1, a catalyst structure was prepared which had a binary catalyst of $K_2O/MnO_2$ (1/99 in a weight ratio) supported thereon.

EXAMPLE 5

An amount of 500 g of manganese dioxide having a specific surface area of 48 $m^2/g$, 5 g of magnesium oxide and 250 g glass beads were added to one liter of water, and the mixture was stirred over three hours, to provide a slurry.

The slurry was impregnated into the same honeycomb as in the Example 1, to provide a catalyst structure having a binary catalyst of $MgO/MnO_2$ (1/99 in a weight ratio) supported thereon in a weight ratio of 101%.

EXAMPLE 6

An amount of 5 g of calcium oxide was used in place of the magnesium oxide, and otherwise in the same manner as in the Example 5, a catalyst structure was prepared which had a binary catalyst of $CaO/MnO_2$ (1/99 in a weight ratio) supported thereon in a support ratio of 100%.

EXAMPLE 7

An amount of 704 g of manganese dioxide having a specific surface area of 48 $m^2/g$ and 250 g glass beads were added to 1173 ml of titania sol ($TiO_2$ content: 150 g/l), and the mixture was stirred over three hours, to provide a slurry.

The slurry was impregnated into the same honeycomb as in the Example 1, to provide a honeycomb structure having $MnO_2/TiO_2$ (80/20 in a weight ratio) supported thereon in a support ratio of 99%.

The structure was found to have a water absorption of 46.0%.

The honeycomb structure was immersed in a 28.1 g/l sodium hydroxide aqueous solution, excess solution was removed therefrom, air dried at normal temperatures, and calcined at a temperature of 100° C. for eight hours, to provide a honeycomb catalyst structure having a ternary catalyst of $Na_2O/MnO_2/TiO_2$ (1.0/79.2/19.8 in a weight ratio) supported thereon.

EXAMPLE 8

An amount of 8.8 g of magnesium oxide was additionally used, but the honeycomb was not immersed in the aqueous solution of sodium hydroxide, and otherwise in the same manner as in the Example 7, a catalyst structure was prepared which had a ternary catalyst of $MgO/MnO_2/TiO_2$ (1.0/79.2/19.8 in a weight ratio) supported thereon in a support ratio of 100%.

EXAMPLE 9

An amount of 500 g of manganese dioxide having a specific surface area of 48 $m^2/g$ and 3333 ml of titania sol ($TiO_2$ content: 150 g/l) were used, and otherwise in the same manner as in the Example 7, a honeycomb structure was prepared which had $MnO_2/TiO_2$ (50/50 in a weight ratio) supported thereon in a support ratio of 103%.

The structure was found to have a water absorption of 48.0%.

The honeycomb structure was immersed in a 26.9 g/l sodium hydroxide aqueous solution, excess solution was removed therefrom, air dried at normal temperatures, and calcined at a temperature of 100° C. for eight hours, to provide a honeycomb catalyst structure having a ternary catalyst of $Na_2O/MnO_2/TiO_2$ (1.0/49.5/49.5 in a weight ratio) supported thereon.

EXAMPLE 10

An amount of 640 g of manganese dioxide, 1067 ml of titania sol ($TiO_2$ content: 150 g/l) and 200 g of Kibushi clay were used, and otherwise in the same manner as in the Example 7, a honeycomb structure was prepared which had $MnO_2/TiO_2$/clay (64/16/20 in a weight ratio) supported thereon in a support ratio of 100%.

The structure was found to have a water absorption of 45.0%.

The honeycomb structure was immersed in a 28.7 g/l sodium hydroxide aqueous solution, and then in the same manner as in the Example 7, a honeycomb catalyst structure was prepared which had a four component catalyst of $Na_2O/MnO_2/TiO_2$/clay (1.0/63.4/15.8/19.8 in a weight ratio) supported thereon.

EXAMPLE 11

An amount of 10 g of magnesium oxide was used, but the honeycomb was not immersed in the aqueous solution of sodium hydroxide, and otherwise in the same manner as in the Example 10, a honeycomb catalyst structure was prepared which had a four component catalyst of $MgO/MnO_2/TiO_2$/clay (1.0/63.4/15.8/19.8 in a weight ratio) supported thereon in a support ratio of 98%.

EXAMPLE 12

An amount of 250 g of manganese dioxide, 1667 ml of titania sol ($TiO_2$ content: 150 g/l) and 500 g of Kibushi clay were used, and otherwise in the same manner as in the Example 7, a honeycomb structure was prepared which had $MnO_2/TiO_2$/clay (25/25/50 in a weight ratio) supported thereon in a support ratio of 99%.

The structure was found to have a water absorption of 43.0%.

The honeycomb structure was immersed in a 30.0 g/l sodium hydroxide aqueous solution, and then in the same manner as in the Example 7, a honeycomb catalyst structure was prepared which had a four component catalyst of $Na_2O/MnO_2/TiO_2$/clay (1.0/24.8/24.8/49.4 in a weight ratio) supported thereon.

EXAMPLE 13

An amount of 10 g of magnesium oxide was used, but the honeycomb was not immersed in the aqueous solution of sodium hydroxide, and otherwise in the same manner as in the Example 12, a honeycomb catalyst structure was prepared which had a four component catalyst of $MgO/MnO_2/TiO_2$/clay (1.0/24.8/24.8/49.4 in a weight ratio) supported thereon in a support ratio of 100%.

COMPARATIVE EXAMPLE 1

In the same manner as in the Example 1, manganese dioxide was supported on a honeycomb structure in a support ratio of 99%, to prepare a catalyst structure without immersing the honeycomb in an aqueous solution of sodium hydroxide.

COMPARATIVE EXAMPLE 2

In the same manner as in the Example 7, $MnO_2/TiO_2$ (80/20 in a weight ratio) was supported on a honeycomb structure in a support ratio of 99%, to prepare a catalyst structure without immersing the honeycomb in an aqueous solution of sodium hydroxide.

COMPARATIVE EXAMPLE 3

In the same manner as in the Example 9, $MnO_2/TiO_2$ (50/50 in a weight ratio) was supported on a honeycomb structure in a support ratio of 103%, to prepare a catalyst structure without immersing the honeycomb in an aqueous solution of sodium hydroxide.

COMPARATIVE EXAMPLE 4

In the same manner as in the Example 10, $MnO_2/TiO_2$/clay (64/16/20 in a weight ratio) was supported on a honeycomb structure in a support ratio of 100%, to prepare a catalyst structure without immersing the honeycomb in an aqueous solution of sodium hydroxide.

COMPARATIVE EXAMPLE 5

In the same manner as in the Example 12, $MnO_2/TiO_2$/clay (25/25/50 in a weight ratio) was supported on a honeycomb structure in a support ratio of 99%, to prepare a catalyst structure without immersing the honeycomb in an aqueous solution of sodium hydroxide.

REFERENCE EXAMPLE 1

An amount of 300 g of $MnO_2$ having a specific surface area of 48 $m^2/g$, 1287 g of titanium tetrachloride ($TiO_2$ content: 27.2% by weight) and 1750 g of silica sol ($SiO_2$ content: 20% by weight) were added to water while ammonia gas was blown into the mixture to neutralize the mixture and provide slurry precipitates.

After fully washing with water, the precipitate was calcined at a temperature of 500° C. for three hours. After cooling, the precipitate was crushed with a sample mill provided with a screen of 0.5 mm meshes, to provide a ternary oxide of a specific surface area of 162 m²/g.

Then 500 g of the oxide was suspended in one liter of water, 250 g of glass beads were added thereto, and the mixture was stirred for 30 minutes, to provide a slurry. The slurry was immersed in the same honeycomb structure as hereinbefore, to provide a catalyst structure which had a ternary catalyst of $MnO_2/TiO_2/SiO_2$ (30/35/35 in a weight ratio) supported thereon in a support ratio of 100%.

B. Measurement of Catalyst Activity

The activity of the catalysts prepared in the Examples 1–13, Comparative Examples 1–5 and Reference Example 1 was measured in the same manner as hereinbefore described under two reaction conditions I and II. In the conditions I, the reaction was carried out at 20° C. under an area velocity of 25 m³/m²·hr with a concentration of ozone of 0.2 ppm at the inlet of the reactor. In the conditions II, the reaction was carried out at 20° C. with varied ozone concentrations at the inlet of the reactor and area velocities so that CA values were 10, 30 and 50, respectively, and the ozone decomposition rate was determined at the initial stage, after one hour and two hours to evaluate durability of the catalyst.

The results are shown in the Tables 3 and 4. As apparent from the results, the catalysts prepared in the Examples 1–13 were found higher in ozone decomposition acitivity and more durable under the severe reaction conditions than the catalyst of the Comparative Examples 1–5 and Reference Example 1.

TABLE 3

| | Catalysts | Compositions (Weight ratio) | Ozone Decomposition Rate (%) |
|---|---|---|---|
| Example 1 | $Na_2O/MnO_2$ | 1/99 | 100.0 |
| Example 2 | $Na_2O/MnO_2$ | 2.9/97.1 | 100.0 |
| Example 3 | $Na_2O/MnO_2$ | 4.8/95.2 | 100.0 |
| Example 4 | $K_2O/MnO_2$ | 1/99 | 100.0 |
| Example 5 | $MgO/MnO_2$ | 1/99 | 99.7 |
| Example 6 | $CaO/MnO_2$ | 1/99 | 99.4 |
| Example 7 | $Na_2O/MnO_2/TiO_2$ | 1/79.2/19.8 | 100.0 |
| Example 8 | $MgO/MnO_2/TiO_2$ | 1/79.2/19.8 | 99.7 |
| Example 9 | $Na_2O/MnO_2/TiO_2$ | 1/49.5/49.5 | 99.9 |
| Example 10 | $Na_2O/MnO_2/TiO_2$/clay | 1/63.4/15.8/19.8 | 100.0 |
| Example 11 | $MgO/MnO_2/TiO_2$/clay | 1/63.4/15.8/19.8 | 99.7 |
| Example 12 | $Na_2O/MnO_2/TiO_2$/clay | 1/24.8/24.8/49.4 | 100.0 |
| Example 13 | $MgO/MnO_2/TiO_2$/clay | 1/24.8/24.8/49.4 | 99.7 |
| Compara. 1 | $MnO_2$ | 100 | 97.8 |
| Compara. 2 | $MnO_2/TiO_2$ | 80/20 | 96.7 |
| Compara. 3 | $MnO_2/TiO_2$ | 50/50 | 93.9 |
| Compara. 4 | $MnO_2/TiO_2$/clay | 64/16/20 | 95.6 |
| Compara. 5 | $MnO_2/TiO_2$/clay | 25/25/50 | 92.6 |
| Reference 1 | $MnO_2/SiO_2/TiO_2$ | 30/35/35 | 86.8 |

Note:
Reaction Conditions I

TABLE 4

| | | Reaction Conditions II | | Ozone Decomposition Rate | | |
|---|---|---|---|---|---|---|
| | | Ozone Concentration | | | After | |
| | CA* | at Inlet (ppm) | Area Velocity (m³/m² · hr) | Initial | 1 hour (%) | 2 hours |
| Example 1 | 10 | 1 | 10 | 100 | 100 | 100 |
| | | 5 | 2 | 100 | 100 | 100 |
| | | 10 | 1 | 100 | 100 | 100 |
| | 30 | 1 | 30 | 99.9 | 99.9 | 99.8 |
| | | 5 | 6 | 100 | 100 | 100 |
| | | 10 | 3 | 100 | 100 | 100 |
| | 50 | 1 | 50 | 98.1 | 98.0 | 98.0 |
| | | 5 | 10 | 100 | 99.0 | 99.0 |
| | | 10 | 5 | 100 | 100 | 100 |
| | 70 | 1 | 70 | 94.2 | 94.1 | 94.1 |
| | | 5 | 14 | 100 | 100 | 100 |
| | | 10 | 7 | 100 | 100 | 100 |
| Example 2 | 30 | 1 | 30 | 99.9 | 99.9 | 99.8 |
| | | 5 | 6 | 100 | 100 | 100 |
| | | 10 | 3 | 100 | 100 | 100 |
| | 50 | 1 | 50 | 98.5 | 98.5 | 98.4 |
| | | 5 | 10 | 100 | 100 | 99.9 |
| | | 10 | 5 | 100 | 100 | 100 |
| | 70 | 1 | 70 | 95.0 | 95.0 | 94.7 |
| | | 5 | 14 | 100 | 100 | 100 |
| | | 10 | 7 | 100 | 100 | 100 |
| Example 3 | 50 | 1 | 50 | 98.6 | 98.5 | 98.5 |
| | | 5 | 10 | 100 | 100 | 99.9 |
| | | 10 | 5 | 100 | 100 | 100 |
| Example 4 | 50 | 1 | 50 | 98.0 | 97.9 | 97.9 |
| | | 5 | 10 | 100 | 100 | 100 |
| | | 10 | 5 | 100 | 100 | 100 |
| Example 5 | 50 | 1 | 50 | 94.5 | 94.3 | 94.3 |
| | | 5 | 10 | 100 | 100 | 99.9 |

TABLE 4-continued

| | | Reaction Conditions II | | Ozone Decomposition Rate | | |
| --- | --- | --- | --- | --- | --- | --- |
| | | Ozone Concentration | | | After | |
| | CA* | at Inlet (ppm) | Area Velocity (m³/m² · hr) | Initial | 1 hour (%) | 2 hours |
| | | 10 | 5 | 100 | 100 | 100 |
| Example 6 | 50 | 1 | 50 | 92.4 | 92.4 | 92.3 |
| | | 5 | 10 | 100 | 99.9 | 99.8 |
| | | 10 | 5 | 100 | 100 | 100 |
| Example 7 | 50 | 1 | 50 | 97.9 | 97.8 | 97.8 |
| | | 5 | 10 | 100 | 100 | 99.9 |
| | | 10 | 5 | 100 | 100 | 100 |
| Example 8 | 50 | 1 | 50 | 94.4 | 94.3 | 94.3 |
| | | 5 | 10 | 100 | 100 | 99.9 |
| | | 10 | 5 | 100 | 100 | 100 |
| Example 9 | 50 | 1 | 50 | 97.7 | 97.7 | 97.6 |
| | | 5 | 10 | 100 | 100 | 100 |
| | | 10 | 5 | 100 | 100 | 100 |
| Example 10 | 50 | 1 | 50 | 98.1 | 98.0 | 98.0 |
| | | 5 | 10 | 100 | 100 | 99.9 |
| | | 10 | 5 | 100 | 100 | 100 |
| Example 11 | 50 | 1 | 50 | 94.7 | 94.6 | 94.6 |
| | | 5 | 10 | 100 | 99.8 | 99.8 |
| | | 10 | 5 | 100 | 100 | 100 |
| Example 12 | 50 | 1 | 50 | 98.6 | 97.9 | 97.9 |
| | | 5 | 10 | 100 | 100 | 99.9 |
| | | 10 | 5 | 100 | 100 | 100 |
| Example 13 | 50 | 1 | 50 | 94.6 | 94.6 | 94.5 |
| | | 5 | 10 | 100 | 100 | 99.9 |
| | | 10 | 5 | 100 | 100 | 100 |
| Compara. 1 | 10 | 1 | 10 | 100 | 99.2 | 94.5 |
| | | 5 | 2 | 100 | 100 | 100 |
| | | 10 | 1 | 100 | 100 | 100 |
| | 30 | 1 | 30 | 95.9 | 79.8 | 62.0 |
| | | 5 | 6 | 100 | 100 | 99.2 |
| | | 10 | 3 | 100 | 100 | 100 |
| | 50 | 1 | 50 | 85.3 | 61.7 | 44.0 |
| | | 5 | 10 | 100 | 99.2 | 94.5 |
| | | 10 | 5 | 100 | 100 | 99.7 |
| | 70 | 1 | 70 | 74.6 | 49.6 | 33.9 |
| | | 5 | 14 | 99.9 | 96.8 | 87.4 |
| | | 10 | 7 | 100 | 99.9 | 98.4 |
| Compara. 2 | 10 | 1 | 10 | 100 | 98.6 | 91.8 |
| | | 5 | 2 | 100 | 100 | 100 |
| | | 10 | 1 | 100 | 100 | 100 |
| | 30 | 1 | 30 | 94.1 | 98.6 | 91.8 |
| | | 5 | 6 | 100 | 99.9 | 98.4 |
| | | 10 | 3 | 100 | 100 | 100 |
| | 50 | 1 | 50 | 81.7 | 57.7 | 39.3 |
| | | 5 | 10 | 100 | 98.6 | 91.8 |
| | | 10 | 5 | 100 | 100 | 99.3 |
| Compara. 3 | 10 | 1 | 10 | 99.9 | 97.0 | 87.8 |
| | | 5 | 2 | 100 | 100 | 100 |
| | | 10 | 1 | 100 | 100 | 100 |
| | 30 | 1 | 30 | 90.3 | 68.9 | 50.3 |
| | | 5 | 6 | 100 | 99.7 | 97.0 |
| | | 10 | 3 | 100 | 100 | 99.9 |
| Compara. 4 | 10 | 1 | 10 | 100 | 98.0 | 90.0 |
| | | 5 | 2 | 100 | 100 | 100 |
| | | 10 | 1 | 100 | 100 | 100 |
| | 30 | 1 | 30 | 92.6 | 72.7 | 53.5 |
| | | 5 | 6 | 100 | 99.8 | 97.8 |
| | | 10 | 3 | 100 | 100 | 100 |
| Compara. 5 | 10 | 1 | 10 | 99.8 | 96.3 | 86.5 |
| | | 5 | 2 | 100 | 100 | 100 |
| | | 10 | 1 | 100 | 100 | 100 |
| | 30 | 1 | 30 | 88.5 | 66.7 | 48.7 |
| | | 5 | 6 | 100 | 99.6 | 96.4 |
| | | 10 | 3 | 100 | 100 | 99.9 |
| Reference 1 | 10 | 1 | 10 | 99.2 | 76.7 | 58.3 |
| | | 5 | 2 | 100 | 99.9 | 98.7 |
| | | 10 | 1 | 100 | 100 | 99.9 |
| | 30 | 1 | 30 | 80.2 | 38.5 | 25.3 |
| | | 5 | 6 | 100 | 91.2 | 76.7 |
| | | 10 | 3 | 100 | 99.2 | 94.5 |
| | 50 | 1 | 50 | 62.2 | 25.3 | 16.1 |
| | | 5 | 10 | 100 | 76.7 | 58.3 |
| | | 10 | 5 | 100 | 94.6 | 82.6 |

*(ppm · m³/m² · hr)

What is claimed is:

1. A catalyst structure for ozone decomposition which comprises a catalyst comprising clay, manganese dioxide and at least one oxide of a metal selected from the group consisting of Co, Ni and Ag, supported on an inactive carrier material.

2. The catalyst structure as claimed in claim 1, wherein the catalyst comprises 10-50% by weight of clay, 20-90% by weight of manganese dioxide and at least one oxide of a metal selected from the group consisting of Co, Ni and Ag, wherein the amount of said at least one oxide is 1-30% by weight based on the total amount of the manganese oxide and said at least one oxide.

3. A method of producing a catalyst structure for ozone decomposition which comprises immersing an inactive carrier material in a slurry of a catalyst comprising clay, manganese dioxide and at least one oxide of a metal selected from the group consisting of Co, Ni and Ag, and drying the carrier material to support the catalyst on the carrier material.

4. The method as claimed in claim 3, wherein the catalyst comprises 10-50% by weight of clay, 20-90% by weight of manganese dioxide and at least one oxide of a metal selected from the group consisting of Co, Ni and Ag, wherein the amount of said at least one oxide is 1-30% by weight based on the total amount of the manganese oxide and said at least one oxide.

* * * * *